United States Patent Office 3,509,233
Patented Apr. 28, 1970

3,509,233
HYDROLYSIS RESISTANT ELASTOMERIC POLY (CARBONATE URETHANES)
Erwin Muller, Leverkusen, Wilhelm Kallert, Cologne-Stammheim, Joszef Ivanyi, Opladen, and Wilhelm Thoma, Cologne-Flittard, Germany, assignors to Farbenfabriken Bayer Aktiengesellschaft, Leverkusen, Germany, a corporation of Germany
No Drawing. Filed Apr. 2, 1968, Ser. No. 718,206
Int. Cl. C08g 22/04, 41/04
U.S. Cl. 260—858          4 Claims

ABSTRACT OF THE DISCLOSURE

Polyurethane prepared from diisocyanates, chain lengthening agents containing at least two hydrogen atoms which are reactive with isocyanate groups and polyhydroxy compounds which are mixtures of from about 10% to about 50% by weight of a 1,6-hexanediol polycarbonate and from about 50% to about 90% by weight of an hydroxyl polyester.

---

This invention relates to cross-linked and cross-linkable elastomeric polyurethanes and, more particularly, to a unique method for the preparation of such polyurethanes having improved properties.

The production of cross-linkable elastic polyurethanes from high molecular weight, linear dihydroxy compounds, diisocyanates and low molecular weight chain lengthening agents which contain at least two hydrogen atoms that are reactive with isocyanates is already known. The high molecular weight, linear dihydroxy compounds used are usually hydroxyl-containing polyesters of dicarboxylic acids, often adipic acid polyesters. In addition to having excellent mechanical properties, polyurethane elastomers obtained from adipic acid polyesters exhibit a varying resistance to hydrolysis which is influenced mainly by the glycol component therein. Thus, for example, polyurethane elastomers obtained from ethylene glycoladipic acid polyesters have a lower resistance to hydrolysis than those obtained from 1,6-hexanediol-adipic acid polyesters. Often the addition of a certain amount of 1,6-hexanediol as a second glycol component is sufficient to improve the resistance to hydrolysis of a polyurethane elastomer obtained from adipic and polyesters.

On the other hand, polyurethane elastomers having a very high resistance to hydrolysis can be obtained if, instead of polyesters such as adipic acid polyesters, hydroxyl-containing polycarbonates containing 1,6-hexanediol or a proportion of b-hydroxyethyl- or -propyl- 1,6-hexanediol as the glycol component are used.

It is therefore an object of this invention to provide a cross-linkable or cross-linked polyurethane and a method for preparaing it which is devoid of the foregoing disadvantages.

Another object of this invention is to provide polyurethane elastomers which have a high resistance to hydrolysis as well as improved mechanical properties.

Still another object of this invention is to provide polyurethane elastomers which have improved processability over those prepared from pure, 1,6-hexanediol polycarbonates or from formulations containing a high concentration of 1,6-hexanediol polycarbonate.

A further object of this invention is to provide stable elastomeric materials which have excellent mechanical properties and which may be prepared from formulations having incorporated therein any desired polyester composition.

The foregoing objects and others which will become apparent from the following description are accomplished in accordance with this invention, generally speaking, by providing a polyurethane elastomer having a high degree of resistance to hydrolysis and improved mechanical properties prepared by reacting a diisocyanate with a low molecular weight chain lengthening agent containing at least two hydrogen atoms which are reactive with isocyanate groups and from about 10% to about 50% by weight of hexanediol-1,6-polycarbonate and from about 90% to about 50% by weight of a polyester. It has been found the polyurethane elastomers retain the excellent mechanical properties possessed by polyurethane elastomers prepared from hydroxyl polyesters, while at the same time having an increased resistance to hydrolysis, even when small amounts of up to about 10% by weight of the hexanediol-1,6-polycarbonate are employed. However, it has been found that in accordance with the present invention polyurethane elastomers have an extremely high resistance to hydrolysis while retaining the excellent mechanical properties possessed by polyurethane elastomers prepared from hydroxyl polyesters may be achieved when an elastomeric polyurethane is prepared from a high molecular weight linear polyhydroxyl composition which is a mixture of high molecular weight hydroxyl-containing dicarboxylic acid polyesters and an hydroxyl-containing hexanediol-(1,6)-polycarbonate, the proportion of hexanediol-(1,6)-polycarbonate being at least about 10% by weight and not more than about 50% by weight, based on the total amount of polyhydroxyl compounds used.

An suitable hydroxy-containing polyester prepared from any suitable dicarboxylic acids and glycols may be used in admixture with a hexanediol-(1,6)-polycarbonate in the practice of this invention. Some such suitable dicarboxylic acids which may be used are, for example, adipic acid, glutaric acid, succinic acid, sebacic acid and azelaic acid, and examples of glycols are ethylene glycol, propanediol-(1,2), propanediol-(1,3), butanediol-(1,4), neopentyl glycol, hexanediol-(1,6), octanediol-(1,8) and the like although those polyesters prepared from adipic acid are preferred. In addition, any of those polyesters mentioned in German patent specification 1,193,241 and any of those discussed in U.S. Patent 3,201,372 may also be employed. Polyesters prepared from two or more dicarboxylic acids and/or two or more glycols may be used in the process of this invention and the adipic acid polyesters which are particularly preferred are ethylene glycol-adipic acid polyesters, ethylene glycol-butanediol-(1,4)-adipic acid polyesters and neopentyl glycol-hexanediol-(1,6)-adipic acid polyesters.

The hydroxyl-containing hexanediol-1,6-polycarbonates and the hydroxyl polyesters may be prepared by any suitable known method, including the procedure described in copending application Ser. No. 671,198, filed on Sept. 28, 1967 by the same applicants. In this procedure the 1,6-hexanediol-polycarbonate used as the hydroxypolyester is prepared by reacting 1,6-hexanediol with a diarylcarbonate such as diphenylcarbonate, ditolylcarbonate or dinaphthylcarbonate, either by heating the reactants alone or with the use of ester interchange catlysts. Preferably, diphenylcarbonate is used. Polycarbonates of different higher molecular weights are obtained depending on the proportions of 1,6-hexanediol and diarylcarbonate used, always with removal of the calculated quantity of phenol by distillation. Polycarbonates of molecular weights from 800 to 3000 are preferred; however, the most preferred polycarbonates have molecular weights of from about 1500 to about 2000. The hexanediol polycarbonate obtained is a pale wax which has a softening range of 38 to 52° C., depending on its molecular weight.

The 1,6-hexanediol polycarbonate can be prepared by various methods, e.g., by reacting 1,6-hexanediol with phosgene or chloroformic acid esters. The reaction products obtained by such methods, however, still contain chlorine and have reduced functionality and so lead to polyurethanes of poor quality. If polycarbonates are prepared by the reaction of 1,6-hexanediol with dialkylcarbonates such as diethylcarbonate or ethylenecarbonate, the ester interchange may be carried out, as is well known, using alkaline or acid catalysts which, however, remain in the finished polycarbonates and again have an adverse effect on the quality of the polyurethanes produced. Only the reaction 1,6-hexanediol with diarylcarbonates has been found to be suitable for preparing the 1,6-hexanediol polycarbonate for use in the process according to the invention.

Any suitable organic diisocyanates may be used to prepare the elastomers of this invention including, for example, aliphatic, cycloaliphatic, araliphatic, aromatic diisocyanates and the like such as tetramethylene diisocyanate, hexamethylene diisocyanate, cyclohexane - 1,4-diisocyanate, 1-methylcyclohexane-2,4- and 2,6-diisocyanate, xylylene diisocyanate, diphenylether-4,4'-diisocyanate, diphenyl carbonate-4,4'-diisocyanate, diphenylsulphone-4,4'-diisocyanate as well as any of those mentioned in Canadian Patent 683,636 and the like and mixtures thereof. 1,5-naphthylene diisocyanate, 4,4'-diphenylmethane diisocyanate, m- and p-phenylene diisocyanate, 2,4- and 2,6-tolylene diisocyanate and mixtures of isomeric tolylene diisocyanates are especially preferred.

Any suitable chain lengthening agent for the reaction when carried out in the absence of solvents may be used including all glycols in general. Some such suitable glycols are, for example, 1,4-butanediol, 1,6-hexanediol, 2,3-butanediol, p - phenylene - di - b - hydroxyethylether, p - xylylene glycol, naphthalene - di - b - hydroxyethylether and the like. Unsaturated glycols which may be used, for example, for subsequent cross-linking with sulphur include glycerol monoallyl ether, dimethyloldihydropyran 1,4 - butane - bis - N,N' - allyl - N,N' - b - hydroxyethylurethane and the like. If one wishes to subsequently carry out a cross-linking reaction with formaldehyde one may, for example, use m-dihydroxyethyltolylene and the like. Other cross-linking agents may also be used including 3,3' - dichloro - 4,4' - diaminodiphenylmethane, diethyl-toluylenediamine, any of those listed in U.S. Patent 3,201,372 or mixtures thereof and the like.

NH-functional chain lengthening agents, which are particularly useful when the formation of the polyurethane is carried out in a highly polar solvent, include aliphatic or araliphatic diamines such as ethylene diamine, propylene diamine, tetramethylene diamine, methyl hexanediamine, hexahydrophenylene diamine, m-xylylene diamine or cis- and/or trans-hexahydro-m-xylylene diamine, hydrazine, N,N'-diamino-piperazine, dihydrazides such as carbodihydrazide, oxalic acid dihydrazide, malonic acid dihydrazide, glutaric acid dihydrazide and the like and water as well as mixtures of any of the foregoing chain lengtheners.

The elastomeric polyurethanes of this invention may be prepared by any suitable method. For example, one method which may be employed is based on the casting process in which the mixture of linear hydroxyl polyesters and polycarbonates is reacted with an excess of diisocyanate and, after the addition of a chain lengthening, the resulting liquid, isocyanate-containing prepolymer is poured into a mold. After a short time, the product hardens and can be removed from the mold. Elastomers having excellent properties and a high resistance to hydrolysis are obtained by after-heating for about 24 hours at about 100° C.

Another procedure which may also be used involves mixing together the mixture of hydroxyl polyester and polycarbonate and the chain lengthening agent, reacting the admixture with an equivalent or an excess quantity of diisocyanate, and thermoplastically shaping the reaction product with heat and pressure after it has been granulated.

Depending on the proportions of the reactants employed, polyurethane resins having different degrees of hardness and elasticity can be obtained, the hardness increasing with increasing quantities of diisocyanate and glycol and diminishing with decreasing quantities of diisocyanate and glycol. Cross-linked synthetic resins which can be processed like thermoplasts may be obtained in this way.

To obtain processable synthetic resins which are only converted into the cross-linked state in a second step, the mixture of hydroxyl polyesters and polycarbonates may be mixed with a chain lengthening agent and then reacted with less than an equivalent amount of diisocyanate. Rollable products which are stable on storage are thus obtained which may be converted subsequently into the cross-linked state by the incorporation therein of additional quantities of diisocyanate, preferably tolylene diisocyanate. The stable, rollable products may be cross-linked with peroxides if suitable diisocyanates such as diphenylmethane - 4,4' - diisocyanate, for example, are used, or with sulphur or formaldehyde if suitable unsaturated chain lengthening agents are employed.

Predominantly linear, segmented polyurethanes may be obtained by reacting NCO-containing prepolymers with approximately equivalent quantities of NH functional chain lengthening agents such as diamines, hydrazine, and dihydrazides in highly polar solvents including those containing amido and/or sulphoxide groups such as for example, dimethylformamide, dimethylacetamide, dimethylsulphoxide and the like. The resulting polyurethane solutions can be used for the production of highly elastic filaments, coatings and microporous coverings by removing the solvent by any suitable means such as evaporation or coagulation. If desired, these materials may also be cross-linked by the addition of cross-linking agents such as polymethylol compounds.

The products of the instant process may be used in the construction of machinery as sealing materials, drive chains or gear wheels, in the motor car industry, in the textile industry for the production of woven fabrics, as shoe sole and coating materials and the like.

The invention is further illustrated but is not intended to be limited by the following examples in which all parts and percentages are by weight unless otherwise specified.

PREPARATION OF HEXANEDIOL-(1,6)-POLY-CARBONATES AS STARTING MATERIALS (A) A mixture of about 1,303 parts of hexanediol-(1,6) and about 2,140 parts of diphenylcarbonate, is heated in a current of nitrogen. Phenol distills off at about 181° C. The temperature is gradually increased to 210 to 215° C., and a vacuum is applied after the reaction temperature has dropped and the phenol has largely distilled off. The remaining phenol residues are distilled off at an external temperature of 210 to 215° C. under a vacuum of 12 mm. Hg.

The melt is cooled to about 80° C. and is poured onto metal sheets. A pale wax of OH number 81 and softening point 40 to 41° C. is obtained. Yield: 1.5 parts.

(B) 1,265 parts of hexanediol and 2,140 parts of diphenylcarbonate are subjected to ester interchange under the conditions used under (A).

A pale wax of OH number 56 and softening point 46 to 47° C. is obtained.

COMPARISON TEST

About 1000 parts of an hydroxyl polyester having an OH number of about 57 and produced by thermal esterification from adipic acid and ethylene glycol are stirred together with about 180 parts of 1,5-naphthylene diisocyanate at about 126° C. After about 11 minutes, about 20 parts of butanediol-(1,4) are introduced into the thin liquid melt under vacuum and the mixture is poured into wax-lined molds. After about 24 hours at about 150° C., moldings are obtained which have the properties listed in the table following Example 3.

EXAMPLE 1

About 900 parts of the polyester described in the Comparison test are worked up into an elastomeric product after they have been mixed with about 100 parts of a hexanediol-(1,6)-polycarbonate having an OH number of about 60 and prepared by reacting 1,6-hexanediol and diphenylcarbonate and distilling off the excess phenol, in a manner analogous to that described in the comparison test. The properties are listed under the heading 1 in the table following Example 3.

EXAMPLE 2

About 700 parts of the polyester used in the Comparison test and about 300 parts of the polycarbonate of Example 1 are worked up as described in Example 1. The properties of the porduct are listed under the heading 2 in the table following Example 3.

EXAMPLE 3

About 500 parts each of the adipic acid polyester used in the Comparison test and the polycarbonate used in Example 1 are worked up to form an elastomeric product as described above. The properties of the product are listed under the heading 3 in the following table.

TABLE

|  | Comparison test | 1 | 2 | 3 |
|---|---|---|---|---|
| Tensile strength, kg./cm.² according to DIN 53 504 | 320 | 315 | 305 | 325 |
| Elongation at break, percent according to DIN 53 504 | 610 | 615 | 600 | 580 |
| Impact elasticity, percent according to DIN 53 512 | 46 | 47 | 47 | 48 |
| Abrasion, mm.³ according to DIN 53 516 | 35 | 34 | 30 | 32 |
| Tensile strength, kg./cm.² after storage in water at 70° C.: | | | | |
| 14 days | 180 | 260 | 270 | 290 |
| 28 days | 40 | 140 | 210 | 240 |
| 42 days | Destroyed | 50 | 130 | 160 |

EXAMPLE 4

A mixture of about 500 parts of a polyester having an OH number of about 68.4 and prepared from neopentyl glycol, hexanediol-(1,6) and adipic acid, and about 500 parts of a hexanediol-(1,6) polycarbonate having an OH number of about 56 is prepared. About 83 parts of 4,4'-diisocyanato-diphenylmethane are introduced with stirring at about 130° C. into about 200 parts of this anhydrous mixture (OH number 61.6) which has a softening point of about 43° to about 44° C. After about 20 minutes, about 18 parts of butanediol-(1,4) are stirred into the melt and the homogeneous mixture is poured into molds. The mixture solidifies after about 20 minutes; it is then removed from the mold and the moldings are heated for about 20 to about 24 hours at about 100° C. An elastic polyurethane is obtained which has the following mechanical properties:

|  |  | After about 14 days aging by hydrolysis at 70° C., 95% atmospheric moisture |
|---|---|---|
| Strength, kg./cm.² | 310 | 273 |
| Elongation, percent | 428 | 405 |
| Permanent elongation | 19 | 18 |
| Load at 300% elongation | 154 | 124 |
| Shore hardness A | 88 | 86 |
| Elasticity | 34 | 41 |
| Structure | 38 | 36 |

EXAMPLE 5

A mixture of about 500 parts of a neopentyl glycol, adipic acid polyester having an OH number of about 56 and about 500 parts of hexanediol-(1,6)-polycarbonate having an OH number of about 56 is prepared.

About 200 parts of this mixture are reacted under the conditions set forth in Example 4 with about 80 parts of 4,4'-diisocyanato-diphenyl methane and about 18 parts of butanediol-(1,4).

An elastomer having the following mechanical properties is obtained:

|  |  | After about 14 days aging by hydrolysis at 70° C., 95% atmospheric moisture |
|---|---|---|
| Strength kg./cm.² | 297 | 267 |
| Elongation, percent | 377 | 387 |
| Permanent elongation, percent | 14 | 14 |
| Load at 300% elongation | 171 | 138 |
| Shore hardness A | 84 | 81 |
| Elasticity | 21 | 28 |
| Structure | 27 | 24 |

EXAMPLE 6

About 100 parts of a hydroxyl-containing polyesters having a molecular weight of about 1660 and prepared from hexanediol-(1,6), 2,2-dimethylpropanediol-(1,3) (molar ratio 65:35) and adipic acid, are mixed with about 47 parts of an hydroxyl containing polycarbonate having a molecular weight of about 1820 and prepared from hexanediol-(1,6) and 1-(b-hydroxyethoxy)-hexanol-(6) (molar ratio 10:3) and heated for about one hour at about 110° C./12 mm. Hg to dehydrate the reactants. The mixture of the two polyhydroxyl compounds is heated together with about 47 parts of 4,4'-diphenylmethane diisocyanate at about 100° C. for about 60 minutes. The NCO-containing prepolymer melt is then dissolved in about 140 parts of dioxane; the NCO content of this solution is about 1.57%. About 250 parts of the NCO-containing prepolymer solution is run into a solution of about 5 parts of carbodihydrazide in about 370 parts of dimethylformamide at about 50° C. A viscous elastomer solution having a solids content of about 23.4% is obtained.

A highly viscous elastomer solution is poured onto glass plates to form films from which the solvent is evaporated during the course of about 1½ hours at about 100° C.

The elastic films have the following properties:

| | |
|---|---|
| Thickness (mm.) | 0.13 |
| Ultimate tensile strength (kg./cm.²) based on the original cross-section | 713 |
| Elongation (percent) | 590 |
| Ultimate tensile strength (kg./cm.²) based on the cross-section of the rupture | 4900 |
| Modulus (20%) (kg./cm.²) | 23 |
| Modulus (300%) (kg./cm.²) | 145 |
| Tear propagation resistance according to Graves kg./cm.²) | 37 |
| Micro hardness | 61 |

The elastomer solution is spun by a set spinning apparatus into elastic filaments (nozzle: 20 apertures, aperture diameter 0.12 mm., temperature of aqueous precipitation bath about 85° C., spinning velocity about 10 m./min.):

For hydrolytic testing, the filaments are heated for about 4 hours and about 16 hours respectively at about 90° C. in a washing liquor containing soda and soap (2 g./liter and 5 g./liter).

|  | Hydrolysis | | |
|---|---|---|---|
|  | 0 hrs. | 4 hrs. | 16 hrs. |
| Titer (den) | 120 | 123 | 119 |
| Ultimate tensile strength (g./den.) based on the original titre | 0.70 | 0.73 | 0.61 |
| Elongation (percent) | 550 | 635 | 650 |
| Ultimate tensile strength (g./den.) based on the titre at break | 4.6 | 5.4 | 4.6 |
| Modulus (300%) (mg./den.) | 131 | 129 | 129 |
| Modulus (150%) (mg./den.) | 21 | 21 | 19 |
| Permanent elongation (percent) | 15 | 16 | 14 |

In contrast thereto, the ultimate tensile strength of an elastomer filament produced without using the polycarbonate additive dropped to about 0.4 to 0.45 g./den. after about 16 hours hydrolysis.

EXAMPLE 7

About 100 parts of the polyester of hexanediol-(1,6), 2,2-dimethyl-propanediol-(1,3) and adipic acid as described in Example 6 are mixed with about 51 parts of a polycarbonate having a molecular weight of about 2020 and prepared from hexanediol-(1,6), and reacted in a manner analogous to that described in Example 6 with about 36 parts of 4,4'-diphenylmethane diisocyanate. The NCO-containing prepolymer melt is taken up in about 140 parts of chlorobenzene; NCO content about 1.45%.

About 250 parts of the NCO-containing prepolymer solution are run into a solution of about 3 parts of carbodihydrazide in about 400 parts of dimethylformamide with vigorous stirring at about 50° C. The viscosity of the elastomer solution is considerably increased by the addition of about 4 ml. of about a 10% solution of hexane diisocyanate-(1,6) in dioxane in the course of about 2 hours.

The elastomer solution is spun in a manner analogous to that described in Example 6.

|  | Hydrolysis | | |
|---|---|---|---|
|  | 0 hrs. | 4 hrs. | 16 hrs. |
| Titer (den.) | 159 | 156 | 161 |
| Ultimate tensile strength (g./den.) based on the original titer | 0.59 | 0.66 | 0.56 |
| Elongation (percent) | 505 | 545 | 605 |
| Ultimate tensile strength (g./den.) based on the titer at break | 3.6 | 4.3 | 3.9 |
| Modulus (300%) (mg./den.) | 137 | 129 | 115 |
| Modulus (150%) (mg./den.) | 20 | 20 | 18 |
| Permanent elongation (percent) | 18 | 18 | 19 |

EXAMPLE 8

About 200 parts of a mixture of an hydroxyl polyester having a molecular weight of about 1640 and prepared from hexanediol-(1,6), 2,2-dimethylpropanediol-(1,3) and adipic acid and an hydroxyl polycarbonate prepared from hexanediol-(1,6) and having a molecular weight of about 2020, in a ratio by weight of 1:1 are heated together with about 47 parts of 4,4'-diphenylmethane diisocyanate for about 60 minutes at about 100° C. The melt is taken up in about 200 parts of dioxane; the NCO content is about 1.52%. About 400 parts of the NCO-containing prepolymer solution are run into a solution of about 7 parts of carbodihydrazide in about 60 parts of dimethylformamide at about 50° C.

The viscous elastomer solution is shaped into filaments and films as described in Example 6 to obtain an elastic film product having the following properties:

| | |
|---|---|
| Thickness (mm.) | 0.13 |
| Ultimate tensile strength (kg./cm.²) based on the initial cross-section | 750 |
| Elongation (percent) | 540 |
| Ultimate tensile strength (kg./cm.²) based on cross-section of rupture | 4800 |
| Modulus 20% (kg./cm.²) | 21 |
| Modulus 300% (kg./cm.²) | 167 |
| Tear propagation resistance according to Graves (kg./cm.²) | 67 |
| Microhardness | 60 |

FILAMENT

|  | Hydrolysis | | |
|---|---|---|---|
|  | 0 hrs. | 4 hrs. | 16 hrs. |
| Titer (den.) | 158 | 159 | 163 |
| Ultimate tensile strength (g./den.) based on original titer | 0.70 | 0.72 | 0.61 |
| Elongation (percent) | 490 | 540 | 560 |
| Ultimate tensile strength (g./den.) based on titer at break | 4.2 | 4.7 | 4.1 |
| Modulus (300%) (mg./den.) | 152 | 142 | 127 |
| Modulus (150%) (mg./den.) | 18 | 18 | 16 |
| Permanent elongation (percent) | 17 | 17 | 19 |

EXAMPLE 9

About 100 parts of a polyester having a molecular weight of about 2600 and prepared from 2,2-dimethyl-propanediol-(1,3) and adipic acid and about 100 parts of a polycarbonate prepared from hexanediol-(1,6) and having a molecular weight of about 1840 are heated to about 100° C. for about 60 minutes together with about 43 parts of 4,4'-diphenylmethane diisocyanate. When the NCO-containing prepolymer melt is dissolved in about 200 parts of dioxane, a product having an NCO content of about 1.35% is obtained. About 400 parts of this NCO-containing prepolymer solution is run into a solution of about 7 parts of carbodihydrazide in about 640 parts of dimethylformamide with vigorous stirring.

The viscous elastomer solution is formed into films and fibers as described in Example 6.

Film

| | |
|---|---|
| Thickness (mm.) | 0.15 |
| Ultimate tensile strength (kg./cm.²) based on the initial cross-section | 670 |
| Elongation (percent) | 590 |
| Tensile strength (kg./cm.²) based on the cross-section of the rupture | 4620 |
| Modulus 20% (kg./cm.²) | 21 |
| Modulus 300% (kg./cm.²) | 149 |
| Tear propagation resistance according to Graves (kg./cm.²) | 40 |
| Microhardness | 57 |

FILAMENT

|  | Hydrolysis | | |
|---|---|---|---|
|  | 0 hrs. | 4 hrs. | 16 hrs. |
| Titer (den.) | 156 | 158 | 153 |
| Ultimate tensile strength (g./den.) based on the original titre | 0.69 | 0.68 | 0.57 |
| Elongation (percent) | 520 | 570 | 620 |
| Ultimate tensile strength (g./den.) based on the titer at break | 4.3 | 4.6 | 4.1 |
| Modulus (300%) (mg./den.) | 131 | 125 | 113 |
| Modulus (150%) (mg./den.) | 19 | 17 | 14 |
| Permanent elongation (percent) | 16 | 19 | 22 |

EXAMPLE 10

(a) Comparison test without polycarbonates.—About 100 parts of a hy;droxyl polyester having a molecular weight of about 2000 and prepared from ethylene glycol and 1,4-butanediol in a molar ratio of about 1:1 and adipic acid are heated together with about 21 parts of 4,4'-diphenylmethane diisocyanate for about 60 minutes at about 100° C. After the NCO-containing prepolymer melt has been dissolved in about 100 parts of dioxane, the product has an NCO content of about 1.21%.

About 200 parts of this NCO-containing prepolymer solution is run into a solution of about 3 parts of carbodihydrazide in about 225 parts of dimethyl formamide with vigorous stirring. The highly viscous 26% elastomer solution is formed into films and filaments as described as in Example 6.

FILAMENTS

|  | Hydrolysis | | |
|---|---|---|---|
|  | 0 hrs. | 4 hrs. | 16 hrs. |
| Titer (den.) | 153 | 143 | (¹) |
| Tensile strength (g./den.) based on the original titer | 0.42 | 0.20 | |
| Elongation (percent) | 690 | 715 | |
| Tensile strength (g./den.) based on the titer at break | 3.4 | 1.7 | |
| Modulus (300%) (mg./den.) | 76 | 58 | |
| Modulus (150%) (mg./den.) | 17 | 20 | |
| Permanent elongation (percent) | 16 | 20 | |

¹ No longer measurable.

(b) About 100 parts of the polyester described under a) are mixed with about 44 parts of the polycarbonate described in Example 7. The mixture of polyhydroxyl compounds is heated together with about 30 parts of 4,4'- diphenylmethane diisocyanate for about 60 minutes at about 100° C. After dissolving the melt in about 140 parts of dioxane, the NCO content is 1.35%.

About 250 parts of the NCO-containing prepolymer solution is run into a solution of about 4 parts of carbodihydrazide in about 350 parts of dimethyl formamide. The viscosity of the 25% solution is increased by the addition of about 6 ml. of about a 10% solution of hexanediisocyanate-(1,6) in dioxane. The highly viscous elastomer solution is formed into films and filaments as described in Example 6.

FILAMENTS

|  | Hydrolysis | | |
| --- | --- | --- | --- |
|  | 0 hrs. | 4 hrs. | 16 hrs. |
| Titer (den.) | 143 | 142 | 126 |
| Ultimate tensile strength (g./den.) based on the original titer | 0.66 | 0.47 | 0.13 |
| Elongation (percent) | 580 | 610 | 470 |
| Ultimate tensile strength (g./den.) based on the titer at break | 4.5 | 3.4 | 0.75 |
| Modulus (300%) (mg./den.) | 156 | 117 | 75 |
| Modulus (150%) (mg./den.) | 21 | 16 | 9 |
| Permanent elongation (percent) | 14 | 16 | 42 |

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:
1. A composition of matter comprising the reaction product of an organic polyisocyanate with a chain lengthening agent containing at least two active hydrogen atoms as determined by the Zerewitinoff method and a high molecular weight polyhydroxyl composition comprising from about 10 to about 50 percent by weight of a 1,6-hexanediol polycarbonate and from about 50 to about 90 percent by weight of an hydroxyl polyester.
2. The composition of claim 1 wherein the hydroxyl polyester is the reaction product of neopentyl glycol with adipic acid.
3. The composition of claim 1 wherein the hydroxyl polyester is the reaction product of adipic acid with ethylene glycol.
4. The composition of claim 1 wherein the hydroxyl polyester is the reaction product of adipic acid, 1,6-hexanediol and 2,2-dimethylpropanediol-1,3.

References Cited

UNITED STATES PATENTS

| 3,110,686 | 11/1963 | Newton | 260—2.5 |
| 3,187,065 | 6/1965 | McPherson et al. | 260—857 |
| 3,214,489 | 10/1965 | Park | 260—858 |
| 3,248,370 | 4/1966 | Reischl et al. | 260—75 |
| 3,301,825 | 1/1967 | Hostettle et al. | 260—77.5 |
| 3,359,242 | 12/1967 | Seeliger | 260—77.5 |

DONALD E. CZAJA, Primary Examiner

H. S. COCKERAM, Assistant Examiner

U.S. Cl. X.R.

260—75